E. B. MANNING.
Coffee Pot.

No. 105,347.

Patented July 12, 1870.

Witnesses:

Inventor.

United States Patent Office.

EDWARD B. MANNING, OF MIDDLETOWN, CONNECTICUT, ASSIGNOR TO MANNING, BOWMAN & CO., OF SAME PLACE.

*Letters Patent No. 105,347, dated July 12, 1870.*

COFFEE-BOILER.

The Schedule referred to in these Letters Patent and making part of the same.

*To all whom it may concern:*

Be it known that I, EDWARD B. MANNING, of Middletown, in the county of Middlesex and State of Connecticut, have invented a new Improvement in Coffee-Boiler; and I do hereby declare the following, when taken in connection with the accompanying drawings and the letters of reference marked thereon, to be a full, clear, and exact description of the same, and which said drawings constitute part of this specification, and represent, in—

Figure 1:
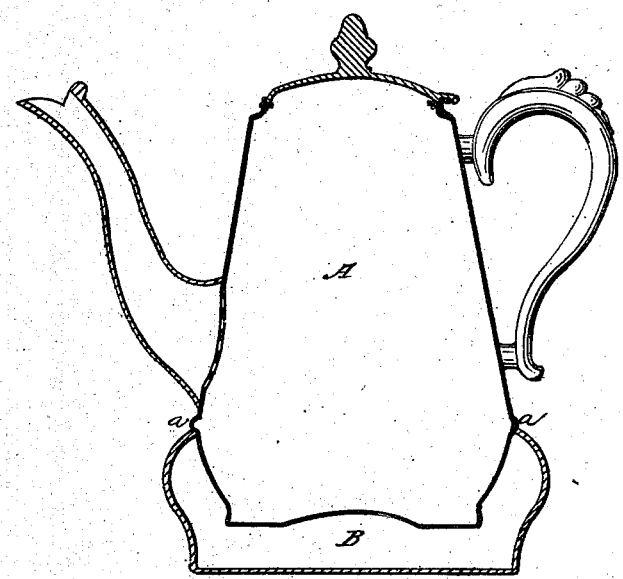
Figure 2:

Figure 1, a vertical central section, illustrating the invention as in use; and, in Figure 2, a sectional view of the boiler, detached.

This invention relates, particularly, to a device to be employed in the use of the tea or coffee-pot patented to me June 3, 1862, and reissued June 27, 1865; again, September 26, 1865; the object being more especially for boiling coffee, so that it may be done without contact with the fire; that is to say, the base of the pot surrounded by a vessel within which the water is placed, and by the heating of which the coffee is boiled; and The invention consists in a metal pan or boiler, formed from a single piece of metal, so as to receive and support the pot, and, at the same time, form a close chamber around the base of the pot.

A is the pot, around the body of which, at $a$, a head or flange is formed, usually by the union of the base with the body of the pot, as in my patent before referred to.

B is a vessel, as seen in fig. 2, formed from a single piece, and, by preference, of hard metal, spun or struck up, as seen in the drawing, and contracted at its upper edge, so as to receive and support the pot, as seen in fig. 1.

The vessel or boiler B is partially filled with water, and set in position for boiling, and the pot, with the prepared coffee therein, set onto the vessel, the boiling of the water in the vessel B imparting to the pot the necessary heat required for cooking the coffee, thus avoiding the necessary contact of the pot directly with the dry or burning heat.

While the invention is especially designed for coffee, it may be used for tea, chocolate, &c.

I claim as my invention—

As an article of manufacture, the vessel B, constructed from a single piece of metal, so as to be applied to the pot, and form a chamber beneath and around its base, substantially in the manner described.

EDWARD B. MANNING.

Witnesses:
E. W. N. STARR,
H. W. B. STARR.